(12) United States Patent
Jun et al.

(10) Patent No.: US 8,230,454 B2
(45) Date of Patent: Jul. 24, 2012

(54) MOTOR DEVICE

(75) Inventors: Chang Keun Jun, Gyunggi-do (KR);
Pyo Kim, Gyunggi-do (KR); Dong Yeon Shin, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/064,547

(22) Filed: Mar. 30, 2011

(65) Prior Publication Data
US 2011/0258652 A1 Oct. 20, 2011

(30) Foreign Application Priority Data

Apr. 15, 2010 (KR) .................. 10-2010-0034870

(51) Int. Cl.
*G11B 17/028* (2006.01)

(52) U.S. Cl. ...................................... 720/707

(58) Field of Classification Search .................... 720/707
See application file for complete search history.

(56) References Cited

U.S. PATENT DOCUMENTS

| 7,493,633 | B2 * | 2/2009 | Ikemoto ........................ 720/707 |
| 7,581,235 | B2 * | 8/2009 | Oota ............................ 720/707 |
| 7,802,273 | B2 * | 9/2010 | Kim et al. ..................... 720/709 |
| 8,015,577 | B2 * | 9/2011 | Smirnov ........................ 720/707 |
| 8,015,578 | B2 * | 9/2011 | Smirnov et al. ................ 720/707 |
| 8,032,903 | B2 * | 10/2011 | Takaki et al. .................. 720/709 |
| 2006/0015886 | A1 | 1/2006 | Kim et al. |
| 2006/0085809 | A1 | 4/2006 | Iwai |
| 2009/0007165 | A1 | 1/2009 | Smirnov et al. |

FOREIGN PATENT DOCUMENTS

| JP | 2006-147132 | 6/2006 |
| KR | 10-2004-0095791 | 11/2004 |
| KR | 10-2005-0095085 | 9/2005 |
| KR | 10-0525231 | 10/2005 |
| KR | 10-2008-0114194 | 12/2008 |

* cited by examiner

*Primary Examiner* — Mark Blouin

(57) ABSTRACT

A motor device includes: a rotor case rotated along with a shaft; a chuck housing mounted on a hub of the rotor case; a chuck member mounted on the chuck housing such that the chuck member is protruded from the interior to an outer side, to fix a disc; and a concave portion formed as a recess on the rotor case to form a gap with the chuck support in contact with the chuck member to thereby prevent a frictional contact between the rotor case and the chuck member.

9 Claims, 5 Drawing Sheets

MOTOR DEVICE

CROSS-REFERENCE TO RELATED APPLICATIONS

This application claims the priority of Korean Patent Application No. 10-2010-0034870 filed on Apr. 15, 2010, in the Korean Intellectual Property Office, the disclosure of which is incorporated herein by reference.

BACKGROUND OF THE INVENTION

1. Field of the Invention

The present invention relates to a motor device and, more particularly, to a motor device devised to reduce force scattering (or dispersion) when a disc is inserted and prevent a chuck member of a chucking device from being abraded.

2. Description of the Related Art

In general, a spindle motor installed in an optical disc drive serves to rotate a disc to allow an optical pick-up mechanism to read data recorded on the disc.

The optical disc drive is required to be light, thin, short, and small, and in particular, in the case of an ultra-slim motor used for a notebook computer, a magnetic circuit for driving the motor is required to have a small size, which is, thus, variably designed to generate sufficient torque to rotate an optical disc and stably rotate the disc.

In addition, the motor device may additionally include a rotor case rotated together when a rotor is rotated and a disc chucking structure mounted in the rotor case to stably mount the disc.

The disc chucking structure mounted in the motor device includes a chuck housing with an opening to allow a chuck member for fixing the disc to be assembled, and the like.

In the related art motor device, when the chuck member is moved to an inner side of the chuck housing by the disc, an end portion of the chuck member is brought into contact with an upper surface of the rotor case, causing the contact surface of the chuck member and the upper surface of the rotor case to be abraded and increasing force scattering (or dispersion or distribution).

As a result, when the disc is inserted into the motor device, the dispersion of a mounting force or detaching force increases and the life spans of the chuck member and the rotor case are shortened, damaging the economical efficiency. Thus, techniques that may overcome these problems are required.

SUMMARY OF THE INVENTION

An aspect of the present invention provides a motor device having a structure in which a movement path of a chuck member of a chucking device prevents the checking member from being brought into contact with the rotor case.

According to an aspect of the present invention, there is provided a motor device including: a rotor case rotated along with a shaft; a chuck housing mounted on a hub of the rotor case; a chuck member mounted on the chuck housing such that the chuck member is protruded from the interior to an outer side, to fix a disc; and a concave portion formed as a recess having a tilt on the rotor case to form a gap with the chuck support in contact with the chuck member to thereby prevent a frictional contact between the rotor case and the chuck member.

The concave portion may be formed such that its depth gradually increases toward the hub from an outer side of the rotor case in a diameter direction of the rotor case.

The concave portion may be formed such that its depth gradually increases from toward the hub form the chuck support.

One end of the concave portion may extend to a portion where the chuck housing is supported.

One end of the concave portion may extend to a portion where the concave portion is in contact with the hub.

A surface of the chuck support may have a curved shape.

The surface of the chuck support may have different tilts based on a central portion thereof.

The rotor case may be a plate member integrally formed with the hub.

A lower surface of the chuck member may not come into contact with the concave portion while the disc is being mounted.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
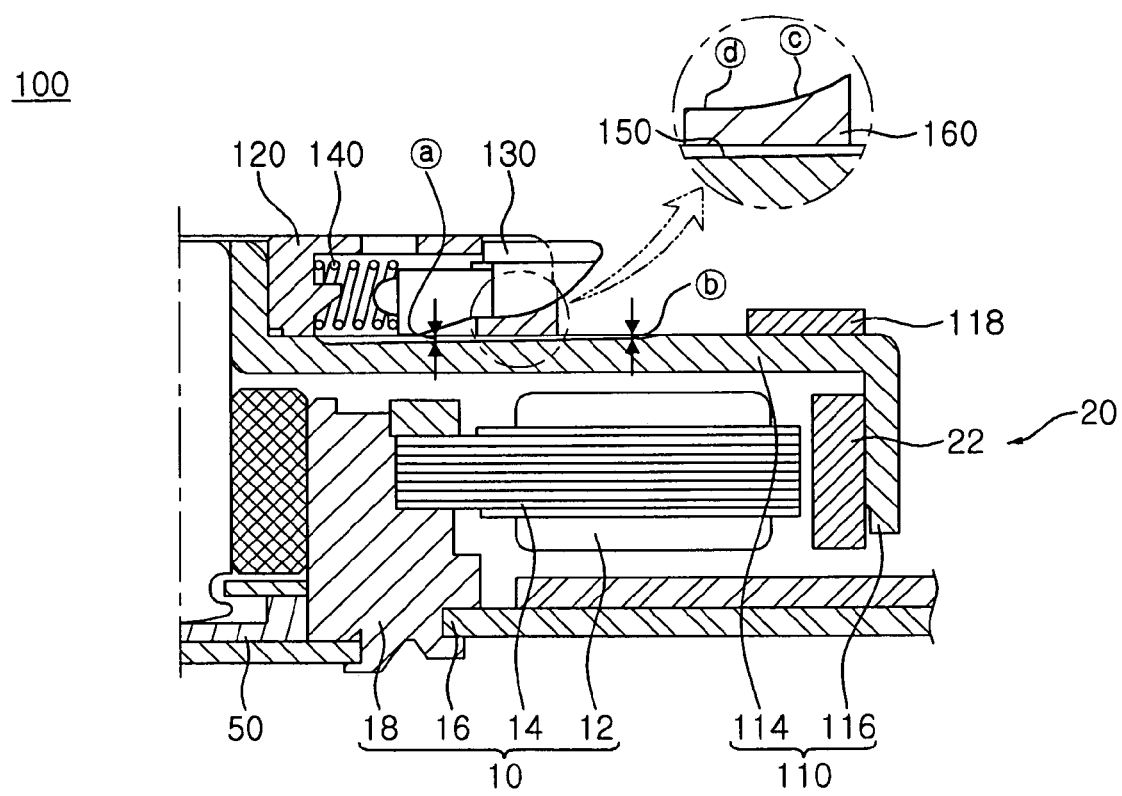
FIG. 1 is a schematic sectional view of a motor device according to an exemplary embodiment of the present invention.

A method for fabricating a motor device according to an exemplary embodiment of the present invention will now be described with reference to FIGS. 1 to 5.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

FIG. 1 is a schematic sectional view of a motor device according to an exemplary embodiment of the present invention.

With reference to FIG. 1, a motor device 100 may include a rotor case 110, a chuck housing 120, a chuck member 130, and a concave portion 150.

The rotor case 110 may include a hub 112 formed to be in contact long along the side at the entrance side of a shaft 40, a horizontal portion 1114 integrally formed with the hub 112 and allowing a disc (D) to be mounted thereon, and a vertical portion 116 vertically bent from the horizontal portion 114 downwardly.

Here, the rotor case 110 is a plate member integrally formed with the hub 112. However, the present invention is not limited thereto, and the rotor case 110 and the hub 112 may be separately formed and assembled.

The horizontal portion 114, an upper surface of the rotor case 110, may be formed to be horizontal to thus prevent the disc (D) from being inclined when the disc (D) is mounted on the horizontal portion 114. A buffer member 118 may be formed on the horizontal portion 114 such that it is in contact with a lower surface of the disc (D). Preferably, the buffer member 118 may be made of rubber.

The chuck housing 120 is press-fit to the hub 112 of the rotor case 110 and may have an opening providing an accommodation space in which a chuck member 130 is accommodated to be exposed.

The chuck member 130 may be mounted in the opening such that it is exposed, and a spring member 140 coupled with the chuck member 130 may be inserted into the interior of the opening.

The chuck member 130 is mounted in the chuck housing 120 such that one end portion thereof is protruded to an outer side through the opening, and has a curved lower surface and is in contact with a chuck support 160. Accordingly, the chuck member 130 may move along a contact surface of the chuck support 160 by a force with which the disc (D) is inserted.

In this case, the other end portion of the chuck member 130 positioned at the inner side of the chuck housing 120 may be disposed to be horizontal to the horizontal portion 114 of the rotor case 110.

The concave portion 150 is a recess formed on the horizontal portion 114 of the rotor case 110. The concave portion 150 may be configured to prevent a frictional contact between the rotor case 110 and the chuck member 130.

In other words, the concave portion 150 is formed as a recess on the rotor case 110 to form a certain gap between the chuck support 160 in contact with the chuck member 130 and the rotor case 110, and the depth of the recess may have a tilt.

Here, the concave portion 150 may start to be formed from a point at an outer side than the chuck support 160 but inner side than a point at which a buffer member 118 is positioned.

Thus, because the concave portion 150 may have a tilt, it may be configured such that its tilt gradually increases toward the hub 112 from an outer side of the rotor case 110 in a diameter direction of the rotor case 110. Specifically, the concave portion 150 may be formed on the rotor case such that it has a tilt gradually increasing toward the hub 112 from the chuck support 160 in contact with the chuck member 130.

Accordingly, as shown in FIG. 1, the depth (a) of the recess of the concave portion 150 at the portion where the other end portion of the chuck member 130 is positioned may be greater than the depth (b) of the recess of the concave portion 150 at the portion where the chuck support 160 is positioned.

One end of the concave portion 150 may extend to the portion where the chuck housing 120 is supported. Thus, a support surface for supporting the lower surface of the chuck housing 120 is formed on the upper surface of the rotor case 110.

In the present exemplary embodiment, the depth of the recess may be ¼ of the thickness of the rotor case 110. However, the depth of the recess may be variably set according to a designer's intention.

Accordingly, because the motor device according to the present exemplary embodiment includes the concave portion 150, a recess, having a tilt and formed on the rotor case 110 to form a gap between the chuck support 160 in contact with the chuck member 130 and the rotor case 110, the chuck member 130 and the rotor case 110 can be prevented from brought into contact with each other.

In other words, because the motor device includes the concave portion 150, a recess, formed on the rotor case to have a tilt gradually increasing toward the hub 112 from the chuck support 160 in contact with the chuck member 130, the chuck member 130 and the rotor case 110 can be prevented from being brought into contact with each other.

Thus, a lower surface of the chuck member 130 may not come into contact with the concave portion 150 while the disc (D) is being mounted on the rotor case, and accordingly, the motor device can reduce a dispersion of force when the disc is inserted and prevent a chuck member of a chucking device from being abraded by the presence of the concave portion 150, potentially obtaining economical efficiency.

Here, the concave portion may be formed on the entire area along the circumferential surface of the horizontal portion 114 of the rotor case 110, but preferably, the concave portion 150 is formed only on the upper surface of the rotor case 110 corresponding to a lower portion of the chuck support 160 in contact with the chuck member 130.

The elements illustrated in FIG. 1 will now be described in more detail.

The stator 10, a fixed structure, includes a winding coil generating an electromagnetic force of a certain magnitude when power is applied thereto, and a plurality of extended cores 14 on which the winding coil 14 is wound based on at least one pole in a radial direction.

The rotor 20 is a rotary structure provided to be rotatable with respect to the stator 10. The rotor 20 includes the rotor case 110 having an annular magnet 22, which corresponds to the core 14 at a certain interval, provided on an outer circumferential surface thereof. The magnet 22 is provided as a permanent magnet having an N pole and an S pole alternately magnetized in a circumferential direction to generate a magnetic force of a certain strength.

As shown in FIG. 1, a sleeve 30 may refer to a rotation support member, which corresponds to the rotor 20 spaced apart from each other and forms a slide surface therebetween.

A shaft 40 may be inserted into a shaft hole of the sleeve 30 so as to be rotated together with the rotor case 110, and the rotor case 110 is mounted on an upper surface of the shaft 40. In this case, the shaft 40 may be formed to be long in a rotational axis direction, and a thrust plate 50 is disposed on a lower surface of the shaft 40 to reduce a frictional force with the shaft 40 generated when it is rotated.

The chuck support 160 is formed on the upper surface of the rotor case 110, which serves to support the chuck member 130. In this case, the chuck support 160 may have a curved surface.

In particular, the surface of the chuck support 160 may be formed to have a tilt increasing in an outer circumferential direction. In detail, an outer edge of the chuck support 160 has the highest tilt and is steep.

The outer circumferential direction of the chuck support 160 refers to a direction toward an outer side (c), and an inner circumferential direction may refer to a direction toward an inner side.

Thus, the chuck member 130 is moved inward along the chuck support 160, and in this case, because the tilt in the outer circumferential direction is higher, the chuck member can be easily moved inward although the disc is pressed by a smaller force, and a defective mounting that the disc is caught in the middle can be prevented by virtue of the curved structure of the chuck support 160.

Figure 2:
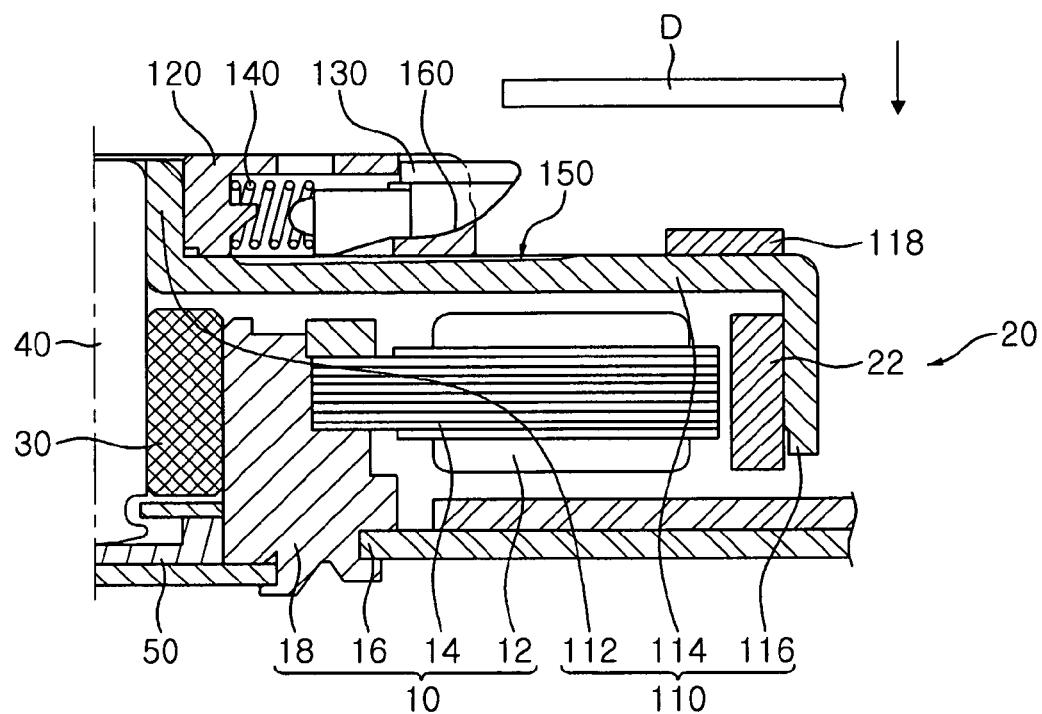
FIGS. 2 to 4 are schematic sectional views for explaining how a chuck member is moved according to an exemplary embodiment of the present invention.
Figure 3:
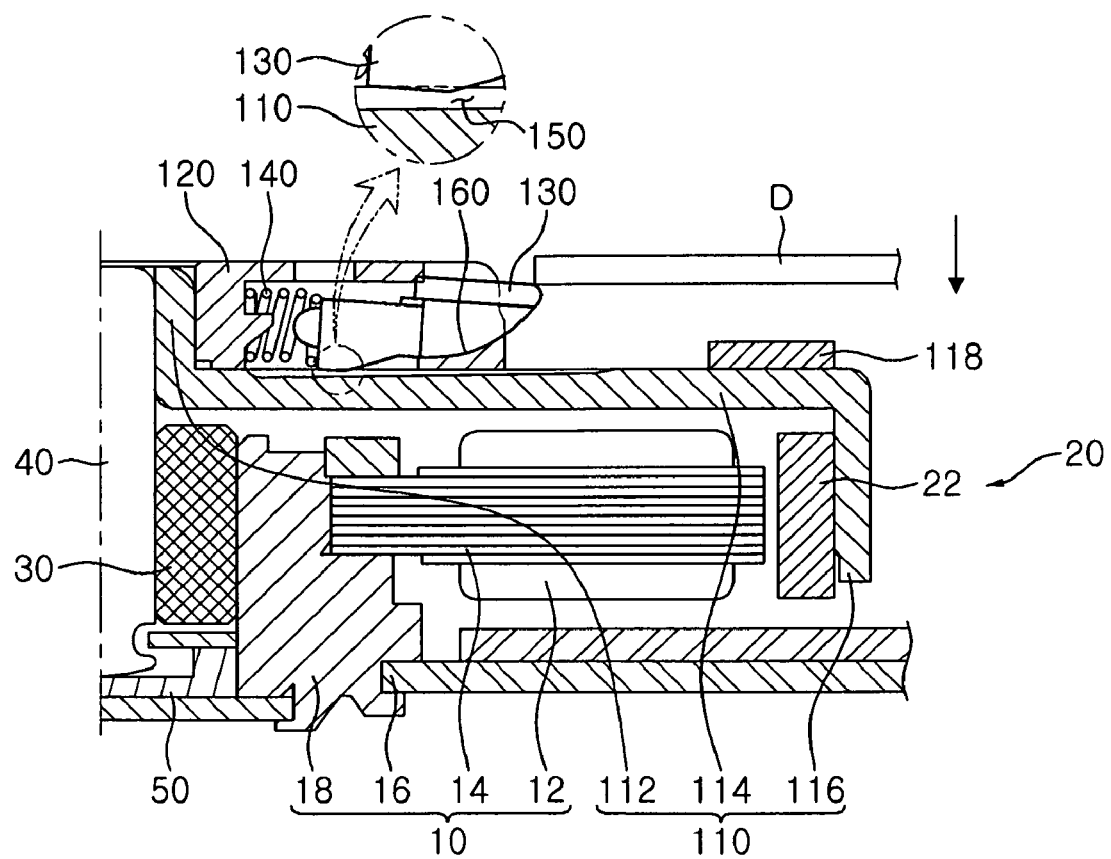
Figure 4:
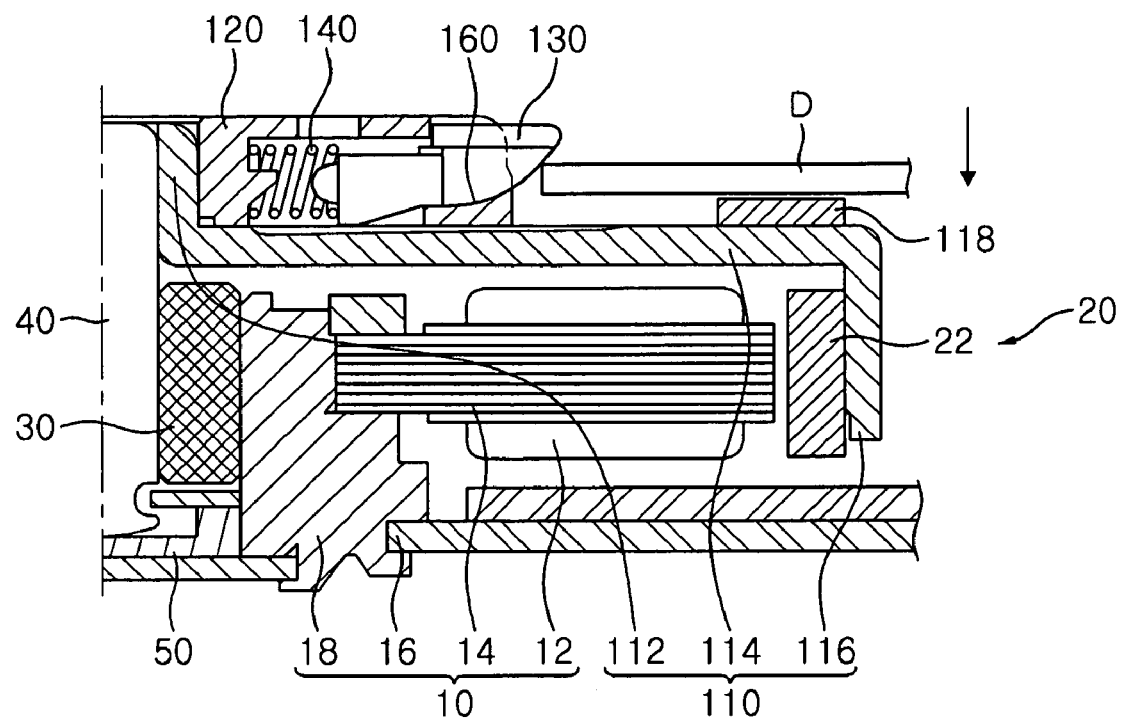

FIGS. 2 to 4 are schematic sectional views for explaining how the chuck member is moved according to an exemplary embodiment of the present invention.

With reference to FIG. 2, the disc (D) is moved toward the rotor case 110 (as indicated by an arrow) so that a hole in the disc (D) can be mounted by the chuck member 130.

In this case, as mentioned above, the chuck member 130 is mounted at the opening of the chuck housing 120 such that the chuck member 130 is exposed to an outer side of the chuck housing 120, and the lower surface of the chuck member 130 is supported by the chuck support 160.

With reference to FIG. 3, when the disc (D) is moved to a mounting position, an inner side of the hole in the disc (D) and an end portion of the chuck member 130 come into contact with each other, and one end portion of the chuck member 130 is moved in the same direction in which the disc (D) is moved.

Thus, the other end portion of the chuck member 130 is slightly moved in an inward direction of the rotor case 110 according to the movement of the chuck member 130.

With reference to FIG. 4, after the disc (D) is mounted on the mounting position, the chuck member 130 is returned to its original position by means of the spring 140 positioned in the interior of the chuck housing 120 and the end portion of the chuck member 130 serves to fix the disc (D).

In this case, if the concave portion 150 is not provided to the rotor case 110, the other end portion of the chuck member 130 and the upper surface of the rotor case 110 would come into contact with each other to increase a force dispersion, and the chuck member 130 and the rotor case 110 would frictionally contact.

However, in the present exemplary embodiment, because the concave portion 150, a recess, is formed on the rotor case 110 such that its tilt gradually increases toward the hub 112 from the chuck support 160 in contact with the chuck member 130, the chuck member 1330 and the rotor case 110 can be prevented from being in contact with each other as shown in FIG. 3.

Therefore, in the present exemplary embodiment, when the disc is inserted, force dispersion can be reduced and abrasion of the chip member of the chucking device can be prevented.

Figure 5:
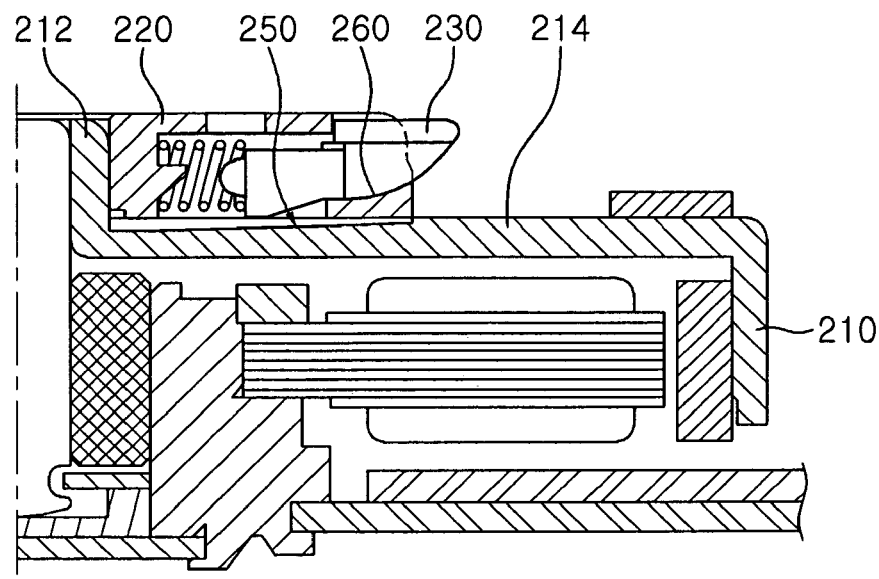
FIG. 5 is a schematic sectional view of a motor device according to another exemplary embodiment of the present invention.

FIG. 5 is a schematic sectional view of a motor device according to another exemplary embodiment of the present invention.

With reference to FIG. 5, a motor device 200 may include a rotor case 210, a chuck housing 220, a chuck member 230, and a concave portion 250.

In the present exemplary embodiment, the rotor case 210, the chuck housing 220, and the chuck member 230 are substantially the same as those of the former exemplary embodiment, so a detailed description thereof will be omitted.

The concave portion 250 is a recess formed on a horizontal portion 214 of the rotor case 210, and in this case, the concave portion 250 may be formed on the horizontal portion 214 of the rotor case 210 such that it has a tilt gradually increasing toward a hub 212 from a chuck support 260 in contact with the chuck member 230.

In this case, the concave portion 250 features that one end portion thereof extends up to a portion where it comes into contact with the hub 212. The other end portion of the concave portion 250 may extend to be positioned at an end portion of the chuck support 260.

Thus, the chuck housing 220 can be press-fit to the hub 212 of the rotor case 210 so as to be mounted, and like in the former exemplary embodiment, the chuck member 230 and the rotor case 210 can be prevented from being in contact with each other by virtue of the concave portion 250.

As set forth above, according to exemplary embodiments of the invention, because the motor device includes the concave portion, a recess, formed on the rotor case such that it has a tilt gradually increasing toward the hub from the chuck support in contact with the chuck member, the chuck member and the rotor case can be prevented from being brought into contact with each other. Thus, the chuck member can be prevented from being abraded, and accordingly, a force dispersion in inserting a disc can be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor device comprising:
   a rotor case rotated along with a shaft;
   a chuck housing mounted on a hub of the rotor case;
   a chuck member mounted on the chuck housing such that the chuck member is protruded from the interior to an outer side, to fix a disc;
   a chuck support formed on the chuck housing, supporting the chuck member; and
   a concave portion formed as a recess having a tilt on the rotor case to form a gap with relation to the chuck support to thereby prevent a frictional contact between the rotor case and the chuck member.

2. The motor device of claim 1, wherein the concave portion is formed such that its depth gradually increases toward the hub from an outer side of the rotor case in a diameter direction of the rotor case.

3. The motor device of claim 1, wherein the concave portion is formed such that its depth gradually increases from toward the hub form the chuck support.

4. The motor device of claim 1, wherein one end of the concave portion extends to a portion where the chuck housing is supported.

5. The motor device of claim 1, wherein one end of the concave portion extends to a portion where the concave portion is in contact with the hub.

6. The motor device of claim 1, wherein a surface of the chuck support has a curved shape.

7. The motor device of claim 1, wherein the surface of the chuck support has different tilts based on a central portion thereof.

8. The motor device of claim 1, wherein the rotor case is a plate member integrally formed with the hub.

9. The motor device of claim 1, wherein a lower surface of the chuck member does not come into contact with the concave portion while the disc is being mounted.

* * * * *